US010877874B2

(12) United States Patent
Alluri

(10) Patent No.: US 10,877,874 B2
(45) Date of Patent: Dec. 29, 2020

(54) SYSTEMS AND METHODS FOR MODELING AND GENERATING TEST REQUIREMENTS FOR SOFTWARE APPLICATIONS

(75) Inventor: Chandra M. Alluri, Herndon, VA (US)

(73) Assignee: FEDERAL HOME LOAN MORTGAGE CORPORATION (FREDDIE MAC), McLean, VA (US)

(*) Notice: Subject to any disclaimer, the term of this patent is extended or adjusted under 35 U.S.C. 154(b) by 1087 days.

(21) Appl. No.: 12/345,084

(22) Filed: Dec. 29, 2008

(65) Prior Publication Data

US 2009/0178021 A1 Jul. 9, 2009

Related U.S. Application Data

(60) Provisional application No. 61/006,187, filed on Dec. 28, 2007.

(51) Int. Cl.
*G06F 11/36* (2006.01)

(52) U.S. Cl.
CPC ............... *G06F 11/3684* (2013.01)

(58) Field of Classification Search
CPC .................................................. G06F 11/3684
USPC .................................................. 703/22; 1/22
See application file for complete search history.

(56) References Cited

U.S. PATENT DOCUMENTS

| | | | |
|---|---|---|---|
| 5,542,043 A | 7/1996 | Cohen et al. | |
| 5,913,023 A * | 6/1999 | Szermer | 714/38.1 |
| 6,353,806 B1 * | 3/2002 | Gehlot | G06F 30/33 703/21 |
| 7,124,406 B2 * | 10/2006 | Ryu | 717/144 |
| 2004/0103396 A1 * | 5/2004 | Nehab | G06F 11/3684 717/127 |
| 2005/0076328 A1 * | 4/2005 | Berenbach | G06F 8/10 717/104 |
| 2005/0138514 A1 * | 6/2005 | Burdine | G01R 31/318569 714/733 |
| 2007/0074166 A1 * | 3/2007 | Overturf et al. | 717/124 |
| 2007/0266366 A1 * | 11/2007 | Bucuvalas | 717/104 |
| 2008/0082969 A1 * | 4/2008 | Agha et al. | 717/130 |

OTHER PUBLICATIONS

John Joseph Chilenski and Steven P. Miller, "Applicability of modified condition/decision converage to software testing", software engineering journal, Sep. 1994.*

Chilenski, John Joseph, and Steven P. Miller. "Applicability of modified condition/decision coverage to software testing." Software Engineering Journal 9.5 (1994). pp. 193-200. (Year: 1994).*

(Continued)

*Primary Examiner* — Kamini S Shah
*Assistant Examiner* — John E Johansen
(74) *Attorney, Agent, or Firm* — Finnegan, Henderson, Farabow, Garrett & Dunner LLP

(57) ABSTRACT

Systems, methods, and computer-readable storage media are described for modeling the requirements of software to generate test requirements. In one exemplary embodiment, a computer-implemented method comprises generating a model of the requirements using a tree graph model, identifying primary paths of the tree graph model using an algorithm, and creating test cases based on the identified primary paths.

23 Claims, 10 Drawing Sheets

(56) References Cited

OTHER PUBLICATIONS

Chilenski, John Joseph, and Steven P. Miller. "Applicability of modified condition/decision coverage to software testing." Software Engineering Journal 9.5 (1994). pp. 193-200. (Year: 1994).*
M. Utting et al, Practical Model-Based Testing: A Tools Approach, Morgan-Kaufmann 2006, http://www.cs.waikato.ac.nz/~marku/mbt/, 2 pages.
http://www.smartesting.com/cms/en/explore/products, "Test Designer™ v3.3," 5 pages.
A.M. Memon, "An Event-Flow Model of GUI-Based Applications for Testing," Software Testing, Verification and Reliability, Jan. 2, 2007, Wiley InterScience (www.interscience.wiley.com), pp. 137-157.
"IEEE Recommended Practice for Software Requirements Specifications," IEEE Std. 830-1993, approved Dec. 2, 1993, 32 pages.
P. Ammann et al., "Introduction to Software Testing" Cambridge University Press, ISBN 978-0-521-88038-1 Hardback, pp. 27-91, 150-165 (2008), 89 pgs.
R. Binder, "Testing Object-Oriented Systems" Addison-Wesley, ISBN 0-201-80938-9, pp. 111-118, 123-125, 176-201, 269-282, (2000), 55 pgs.
B. Beizer, "Software Testing Techniques", Van Nostrand Reinhold, ISBN 0-442-20672-0, (1990), 575 pgs.

* cited by examiner

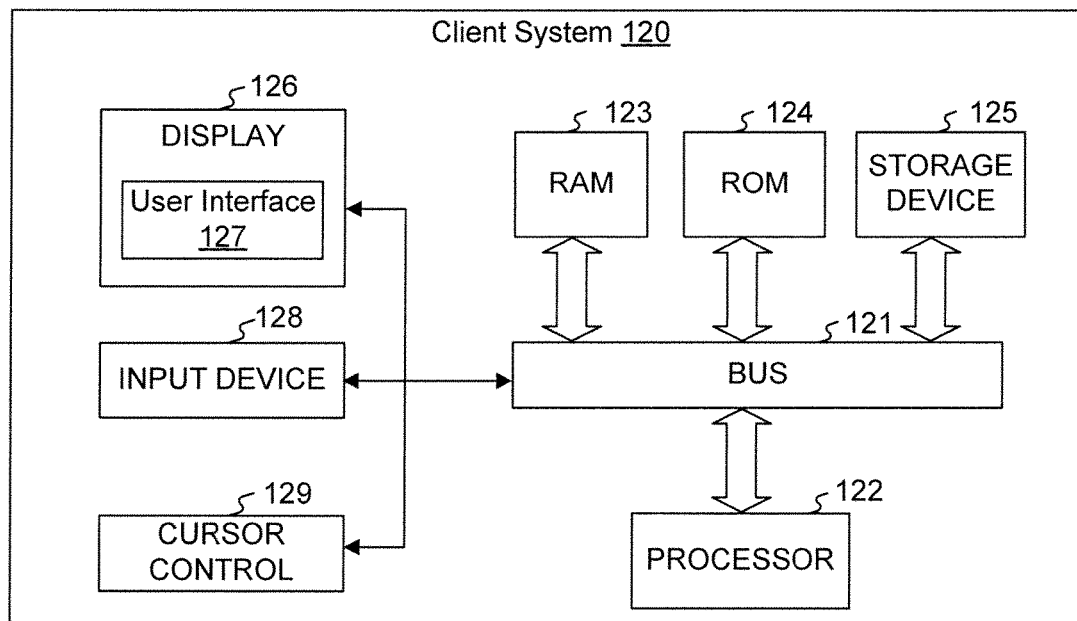
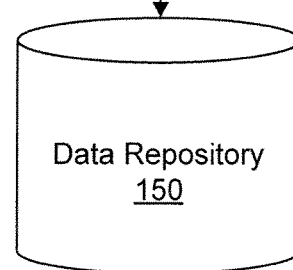
FIG. 1

```xml
<ROOT label="Usecases" id="10001" currentMaxID="10155">
<Usecase label="AUC 5" id="10002">
<Flow label="Main Flow" id="10003">
<Branch label="If Interest Rate Type = Fixed or Balloon" requisitionID="SS_FAP_1122" id="10005">
<Branch label="If LLGfee Ind = Y and LLGfee Type = A-Minus" id="10009">
<Step label="Retrieve Gfee Rate, Buyup Max , A-Minus Buyup" id="10015" type="Step"></Step>
<Step label="Set Remittance Type = GOLD i.e, 19 days" id="10018" type="Step"></Step>
<Step label="Retrieve Gfee rate,Max BUYUP,Super ARC days,Remitence Cycle option,Locked/Floating Indi
<Step label="Retrieve Contract (LPC) Remittance Type" id="10022" type="Step"></Step>
<Branch label="If Remittance Type = Remittance Cycle Option" id="10024">
<Step label="Set Remittance Adj = 0" id="10025" type="Step"></Step>
<Step label="Calculate Max Buyup = MC Product Max Buy Up + Remitence Adj" id="10081"
<Branch label="If Contract Max Buyup >12.5" id="10084">
<Step label="No change in Contract Max Buyup" id="10085" type="Step"></Step>
<Step label="Calculate A-Minus contract Max Buyup = MC product A-Minus Max Buyup" id
<Branch label="If A-Minus contract Max Buyup >15 bps" requisitionID="SS_FAP.123"
<Step label="Set A-Minus contract Max Buyup = User Requested A-Minus Max Buy
</Branch>
<Branch label="If A-Minus contract Max Buyup <=25 bps" id="10122">
<Step label="Set User requested A-Minus Buyup =Calculated contract A-Minus b
</Branch>
</Branch>
```

FIG. 5

SYSTEMS AND METHODS FOR MODELING AND GENERATING TEST REQUIREMENTS FOR SOFTWARE APPLICATIONS

RELATED APPLICATIONS

This application claims the benefit of U.S. Provisional Application No. 61/006,187 filed Dec. 28, 2007, entitled "Systems and Methods of Modeling and Generating Test Requirements for Software Applications," which is incorporated herein by reference in its entirety.

TECHNICAL FIELD

The present disclosure generally relates to the process of software development, and more particularly to systems and methods for modeling and generating test requirements for software applications.

BACKGROUND

The process of software development may include the following general steps: requirements gathering; developing use cases to document the requirements; modeling the use cases; coding the software; and testing the software. Depending on the size and budget of the software development project, the above steps may be performed by one individual or may be divided among individuals or groups of individuals.

For example, the step of gathering requirements may be performed by a business analyst, also commonly referred to as a systems analyst and functional analyst. In gathering requirements, the business analyst may communicate with clients (i.e., the procurer of the software to be developed) to gather the client's requirements for the software. The requirements may be organized, for example, into system requirements, functional requirements, and user requirements.

Once gathered, the requirements may be modeled by the business analyst. Modeling the requirements may allow the requirements to be better managed and more readily understood. In addition, modeling the requirements may assist with the creation of test cases to be used in the testing of the software. The requirements may be modeled using a standardized general-purpose modeling tool, such as the Unified Modeling Language (UML) or modeled using flowcharts, tables, graphs, such as a directed acyclic graph (DAG), and the like.

Using current systems and methods, both the process of modeling the requirements and the development of test cases require highly specialized skills and large quantities of time. Systems and methods consistent with the principles of the present invention facilitate the modeling of the requirements of a software application and the generating of test requirements using the information in the model.

SUMMARY

Consistent with the present invention, as embodied and broadly described herein, systems and methods are disclosed for modeling and generating test requirements for software applications.

According to one embodiment, a computer-implemented method for automated software requirements testing and sensitization for consistent performance, performed by a processor hosted on a server and connected via a network connection to at least one networked database, a modeling tool, and a client system is disclosed. The method comprises retrieving modeling requirements of software, wherein the modeling requirements are specified in the form of one or more use cases for contract pricing; receiving, via a graphical user interface, a user's selection of one or more portions of previously-created models; generating, using the modeling tool, a tree graph model based on the modeling requirements and the one or more user-selected portions of previously-created models, wherein the tree graph model comprises one or more details for uncovering bugs or errors of the software; analyzing the tree graph model and verifying complete path coverage for the modeling requirements, by determining whether predicate and clause coverage criteria of the tree graph model yields n+1 truth values, wherein n is a number of clauses in a predicate of a logical expression in the tree graph model; generating a plurality of test paths for traversing the tree graph model, wherein the plurality of test paths uncover unhandled exceptions corresponding to the bugs or errors; testing the modeling requirements by: selecting, using an algorithm based on the tree graph model, a test path among the plurality of test paths; storing, in a memory, data associated with one or more expected outcomes from traversing the selected test path; generating, using an algorithm and based on the selected test path, one or more data values that cause the processor to traverse one or more branches of the selected test path for the software without the bugs or errors; sensitizing the selected test path by inputting the one or more data values; generating a plurality of test cases based on the tree graph model and the one or more data values, wherein the plurality of test cases exercise each object and relationship in the selected test path; generating one or more test outcomes by traversing the sensitized test path and the plurality of test cases via running the generated data values through the software; retrieving the one or more expected outcomes; comparing the one or more test outcomes to the one or more expected outcomes at multiple intermediate verification points along the selected test path; and conforming the selected test path to produce the expected outcomes, based on a difference between the one or more test outcomes and the one or more expected outcomes; and repeating the testing of the modeling requirements for the plurality of test paths, wherein the test paths are sensitized by inputting the one or more data values that cause the processor to do the equivalent of traversing the test paths if there were no bugs or errors and wherein the sensitized test paths are conformed to produce the expected outcomes.

In another embodiment, a computer-readable medium containing instructions for performing, when executed by a processor hosted on a server and connected via a network connection to at least one networked database, a modeling tool, and a client system, a method for automated software requirements testing and sensitization for consistent performance is disclosed. The method comprises retrieving modeling requirements of software, wherein the modeling requirements are specified in the form of one or more use cases for contract pricing; receiving, via a graphical user interface, a user's selection of one or more portions of previously-created models; generating, using the modeling tool, a tree graph model based on the modeling requirements and the one or more user-selected portions of previously-created models, wherein the tree graph model comprises one or more details for uncovering bugs or errors of the software; analyzing the tree graph model and verifying complete path coverage for the modeling requirements, by determining whether predicate and clause coverage criteria of the tree graph model yields n+1 truth values, wherein n is a number of clauses in a predicate of a logical expression in the tree graph model; generating a plurality of test paths for traversing the tree graph model, wherein the plurality of test paths uncover unhandled exceptions corresponding to the bugs or errors; testing the modeling requirements by: selecting, using an algorithm based on the tree graph model, a test path among the plurality of test paths; storing, in a memory, data associated with one or more expected outcomes from traversing the selected test path; generating, using an algorithm and based on the selected test path, one or more data values that cause the processor to traverse one or more branches of the selected test path for the software without the bugs or errors; sensitizing the selected test path by inputting the one or more data values; generating a plurality of test cases based on the tree graph model and the one or more data values, wherein the plurality of test cases exercise each object and relationship in the selected test path; generating one or more test outcomes by traversing the sensitized test path and the plurality of test cases via running the generated data values through the software; retrieving the one or more expected outcomes; comparing the one or more test outcomes to the one or more expected outcomes at multiple intermediate verification points along the selected test path; and conforming the selected test path to produce the expected outcomes, based on a difference between the one or more test outcomes and the one or more expected outcomes; and repeating the testing of the modeling requirements for the plurality of test paths, wherein the test paths are sensitized by inputting the one or more data values that cause the processor to do the equivalent of traversing the test paths if there were no bugs or errors and wherein the sensitized test paths are conformed to produce the expected outcomes.

In yet another embodiment, a system for automated software requirements testing and sensitization for consistent performance is disclosed. The system comprises a memory having program instructions and a processor hosted on a server and connected via a network connection to at least one networked database, a modeling tool, and a client system wherein the processor executes the program instructions. The executed program instructions perform operations comprising: retrieving modeling requirements of software, wherein the modeling requirements are specified in the form of one or more use cases for contract pricing; receiving, via a graphical user interface, a user's selection of one or more portions of previously-created models; generating, using the modeling tool, a tree graph model based on the modeling requirements and the one or more user-selected portions of previously-created models, wherein the tree graph model comprises one or more details for uncovering bugs or errors of the software; analyzing the tree graph model and verifying complete path coverage for the modeling requirements, by determining whether predicate and clause coverage criteria of the tree graph model yields n+1 truth values, wherein n is a number of clauses in a predicate of a logical expression in the tree graph model; generating a plurality of test paths for traversing the tree graph model, wherein the plurality of test paths uncover unhandled exceptions corresponding to the bugs or errors; testing the modeling requirements by: selecting, using an algorithm based on the tree graph model, a test path among the plurality of test paths; storing, in a memory, data associated with one or more expected outcomes from traversing the selected test path; generating, using an algorithm and based on the selected test path, one or more data values that cause the processor to traverse one or more branches of the selected test path for the software without the bugs or errors; sensitizing the selected test path by inputting the one or more data values; generating a plurality of test cases based on the tree graph model and the one or more data values, wherein the plurality of test cases exercise each object and relationship in the selected test path; generating one or more test outcomes by traversing the sensitized test path and the plurality of test cases via running the generated data values through the software; retrieving the one or more expected outcomes; comparing the one or more test outcomes to the one or more expected outcomes at multiple intermediate verification points along the selected test path; and conforming the selected test path to produce the expected outcomes, based on a difference between the one or more test outcomes and the one or more expected outcomes; and repeating the testing of the modeling requirements for the plurality of test paths, wherein the test paths are sensitized by inputting the one or more data values that cause the processor to do the equivalent of traversing the test paths if there were no bugs or errors and wherein the sensitized test paths are conformed to produce the expected outcomes.

BRIEF DESCRIPTION OF THE DRAWINGS

The accompanying drawings, which are incorporated in and constitute a part of this specification, illustrate various features, embodiments and aspects consistent with the invention and, together with the description, explain advantages and principles of the invention. In the drawings:

FIG. 1 is a block diagram of an exemplary overview of a data processing system suitable for implementing embodiments consistent with the principles of the present invention;

FIGS. 4-6 illustrate screenshots of an exemplary modeling and testing tool, consistent with the principles of the present invention.

DESCRIPTION OF THE EMBODIMENTS

Figure 2:
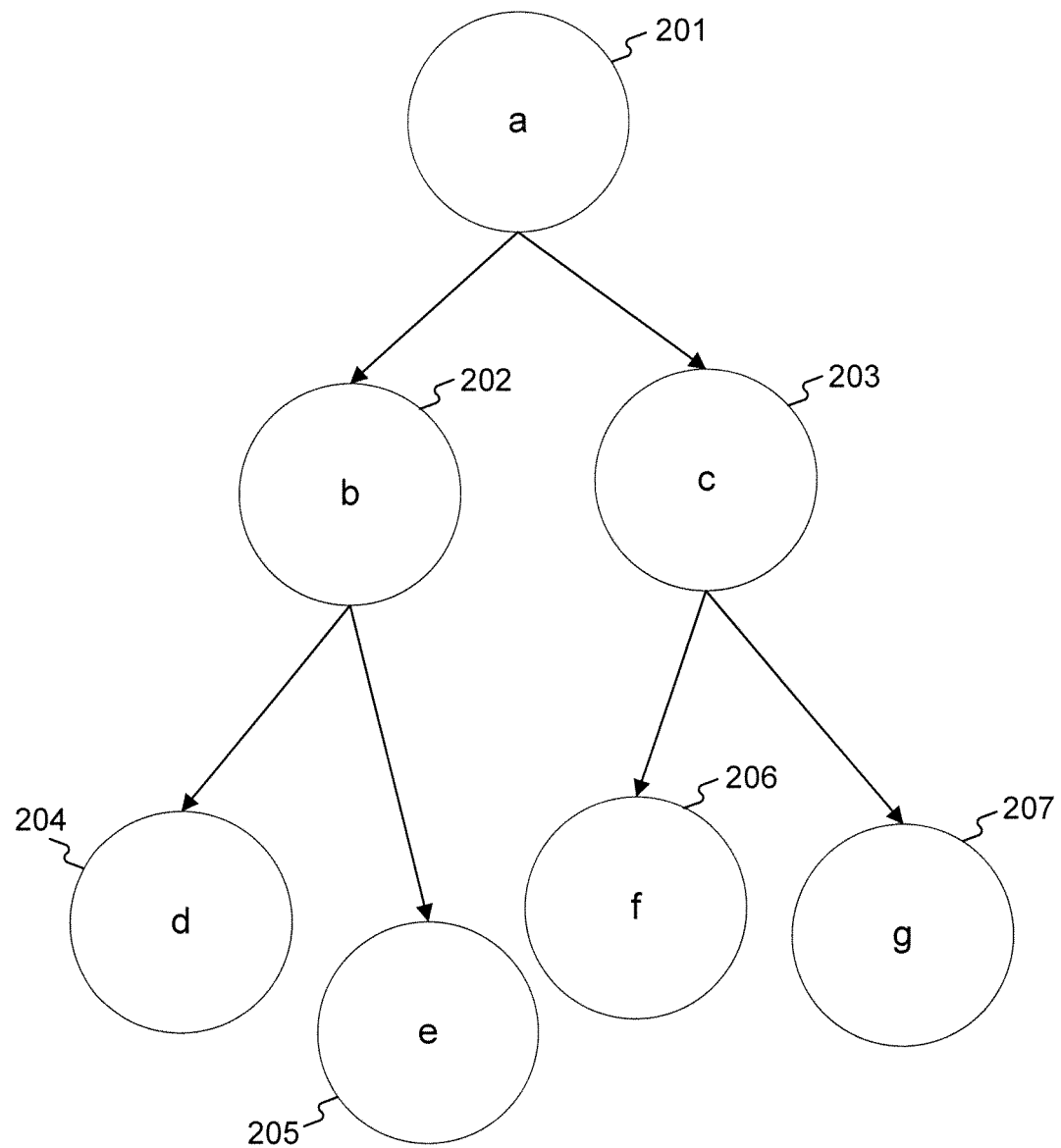
FIG. 2 illustrates an exemplary directed acyclic graph, consistent with the principles of the present invention.

Reference will now be made in detail to various embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

FIG. 1 is a block diagram illustrating an exemplary system 100 in which embodiments consistent with the present invention may be implemented. In the embodiment shown, system 100 includes a front-end system 110, comprising client system 120, and a back-end system 140, comprising data repository 150 and server system 160.

Client system 120 includes a bus 121 or other communication mechanism for communicating information, and a processor 122 coupled with bus 121 for processing information. Client system 120 also includes a main memory, such as a random access memory (RAM) 123 or other dynamic storage device, coupled to bus 121 for storing information and instructions to be executed by processor 122. RAM 123 also may be used to store temporary variables or other intermediate information produced during execution of instructions by processor 122. Client system 120 further includes a read only memory (ROM) 124 or other static storage device coupled to bus 121 for storing static information and instructions for processor 122. A storage device 125, such as a magnetic disk or optical disk, is provided and coupled to bus 121 for storing information and instructions.

Client system 120 may also include a display device 126, such as a thin film transistor liquid crystal display (TFT-LCD), for displaying information to and receiving information from a computer user through, for example, user interface 127. A user may interact with components and software of the back-end system 140 through the use of user interface 127. An input device 128, such as a keyboard including alphanumeric and other keys, may be used for communicating information and command selections to processor 122. Another type of user input device is a cursor control 129, such as a mouse, a trackball, or cursor direction keys for communicating direction information and command selections to processor 122 and for controlling cursor movement on display 126. This input device typically has two degrees of freedom in two axes, a first axis (e.g., x) and a second axis (e.g., y), that allows the device to specify positions in a plane.

Front-end system 110 may be connected to the back-end system 140 through network connection 130. Network connection 130 may include, alone or in any suitable combination, a telephony-based network, a local area network (LAN), a wide area network (WAN), a dedicated intranet, wireless LAN, the Internet, and intranet, a wireless network, a bus, or any other communication mechanisms. Further, any suitable combination of wired and/or wireless components and systems may provide network connection 130. Moreover, network connection 130 may be embodied using bi-directional, unidirectional, or dedicated communication links. Network connection 130 may also implement standard transmission protocols, such as Transmission Control Protocol/Internet Protocol (TCP/IP), Hyper Text Transfer Protocol (HTTP), SOAP, Remote Procedure Call (RPC), or other protocols.

Back-end system 140 includes data repository 150 and server system 160. In the embodiment shown, server system 160 includes modeling and testing tool 170. Modeling and testing tool 170 facilitates a user in the modeling of software requirements and the testing of software during a software development process. A user may interact with the modeling and testing tool 170 through user interface 127 of client system 120. Processor 122 and a processor (not illustrated) of the server system may execute instructions of the modeling and testing tool 170 to perform operations and functions of the modeling and testing tool 170 described in further detail below.

Data repository 150 may comprise one or more databases that store information and are accessed and managed through back-end system 140. By way of example, data repository 150 may be an Oracle™ database, a Sybase™ database, or other relational database. Data repository 150 may be used to store information about the software application that is being modeled and tested. Systems and methods of the present invention, however, are not limited to separate databases or even to the use of a database as other organized collections of data or memory systems will serve as well.

Although the embodiment disclosed in FIG. 1 illustrates the modeling and testing tool 170 stored on the server system 160, alternate embodiments may store the modeling and testing tool 170 on client system 120. For example, modeling and testing tool 170 may be stored using RAM 123, ROM 124, or storage device 125. Processor 122 may execute instructions of the modeling and testing tool 170 to perform operations and functions of the modeling and testing tool 170 described in further detail below. The configuration and number of programs, systems, and processors implementing processes consisted with the invention are not critical to the invention.

In an exemplary requirements gathering process, a user (e.g., a business analyst) may meet with a client to formulate and document the requirements of a software application to be developed. As used herein, the term "requirements" refers to the needs or conditions that the software must fulfill. In one embodiment, requirements are actionable, measurable, testable, related to identified business needs or opportunities, and defined to a level of detail sufficient for the design of the software. The requirements may be organized as user requirements, system requirements, and functional requirements.

For example, the requirements may be organized into a formal document report, commonly referred to as a software requirements specification. The software requirements specification is a complete description of the behavior of the software to be developed. The software requirements specification may include information regarding: interfaces; functional capabilities; performance levels; data structures/elements; safety; reliability; security/privacy; quality; and constraints and limitations. The software requirements specification may also include use cases that describe the user requirements. The user requirements may be generally defined as the interactions that a user will have with the software.

A use case may be generally defined as a sequence of steps that describe a software's behavior as it responds to a request that originates from outside of the software, such as a request from a user or another software. Specifically, use cases are meant to describe sequences of actions that the software performs as a result of inputs from the users; that is, they help express the work flow of a computer application. Because use cases are developed early during the software development process, they may be valuable in helping a tester of the software to start testing activities early.

Although different schemes and templates for the organization of a use case exist, there is a general consensus concerning the core sections of a use case. For example, a use case may comprise: a use case name, which is a unique identifier for the use case; a version, which informs a reader of the stage of the use case; a goal, which briefly describes what the user intends to achieve with the use case; an actor, which is someone or something that interacts with the software; preconditions, which defines the conditions that must be true for a trigger to meaningfully cause the initiation of the use case; a trigger, which describes the event that causes the use case to be initiated; basic course of events (i.e., transaction flows), which are often conveyed as a set of numbered steps that define a primary scenario, or typical course of events (commonly referred to as "primary path," "happy path," "happy flow," "basic flow," or "sunny day"); alternative paths, which represent secondary paths or alternative scenarios; post-conditions, which describe what the change in state of the software will be after the use case completes; and business rules, which are rules or policies that determine how an organization conducts its business with regard to a use case.

A scenario is similar to a use case but, in most instances, not as detailed as a use case. Specifically, a scenario may be defined as one path or work flow of an actor through a part of the software. Scenarios correspond to goals that users will set out to accomplish. A use case, on the other hand, spells out, step by step, what must take place for that scenario to run to a successful completion.

In addition to use cases and scenarios, the software requirements specification generally presents the requirements in a sequence (i.e., course) of events for the software and sequences (i.e., courses) of actions for the software. Functional requirements (i.e., calculations, technical details, data manipulation and processing, and other specific functionality) of the software may also be represented within the software requirements specification as logical expressions and program structures, such as if-else structures, nested if structures, decision tree structures, case/switch structures, and the like. Logical expressions may also be derived from various software artifacts, such as code, specifications, and finite state machines. In one specific implementation, a logical expression may be defined as two arithmetic expressions connected by a relational operator indicating whether an expression is greater than, equal to, or less than the other, or connected by a logical variable, logical constant (e.g., true or false), or logical operator.

The requirements of the software detailed in the software requirements specification may be represented as a model. A model may provide a richer, higher level, and more semantically precise set of constructs than the underlying natural language of the software requirements specification. Using a model may reduce ambiguity, make it easier to check for incompleteness of the captured requirements, and may improve understandability by providing a different perspective from which to view the software.

There are multiple modeling designs and tools, such as the entity-relationship model (ERM), Unified Modeling Language (UML), directed acyclic graph (DAG), transaction flows, activity diagrams, and the like. As disclosed herein, modeling and testing tool 170 may model the requirements of a software using a DAG design.

A DAG is an example of a tree graph. More specifically, a DAG is an example of a directed graph with no directed cycles. A DAG has a topological sort, an ordering of the vertices such that each vertex comes before all vertices it has edges to. FIG. 2 illustrates an exemplary DAG, 200. As illustrated, DAG 200 has six edges (i.e., branches) and seven vertices (i.e., nodes); vertex a (201), vertex b, (202), vertex c (203), vertex d (204), vertex e (205), vertex f (206), and vertex g (207).

The requirements of the software detailed in the software requirements specification may be represented as a tree graph model using modeling and testing tool 170. The modeling and testing tool 170 may model the requirements of a software requirements specification by abstracting the implementation details of, for example, the use cases, activity diagrams, sequence diagrams, state-transition diagrams, and logical expressions contained in the requirements specification. The modeling and testing tool 170 may model the requirements as a tree graph model, and specifically, a DAG.

Figure 3A:
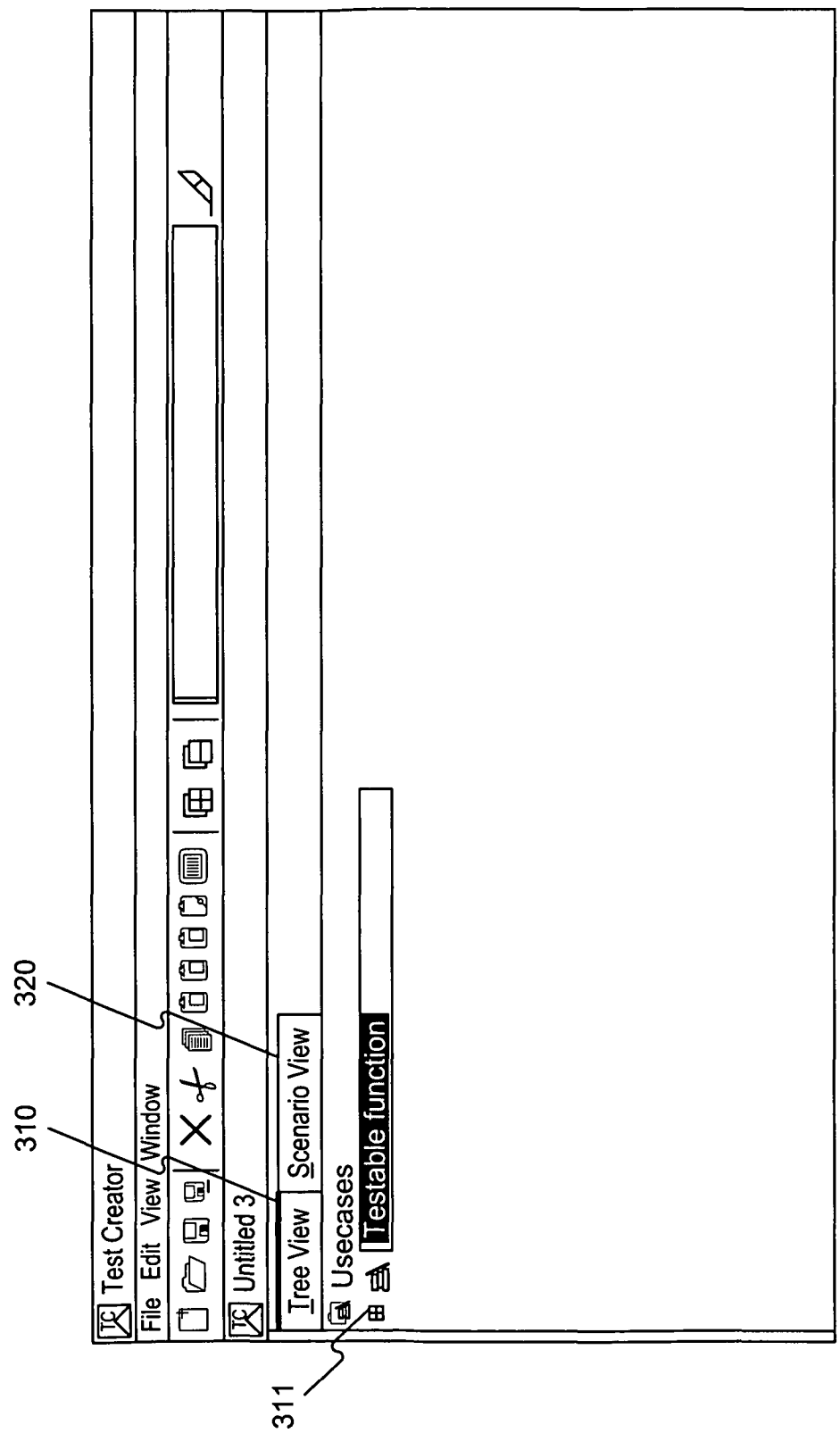
FIGS. 3A-3D illustrate screenshots of an exemplary modeling and testing tool, consistent with the principles of the present invention.
Figure 3B:
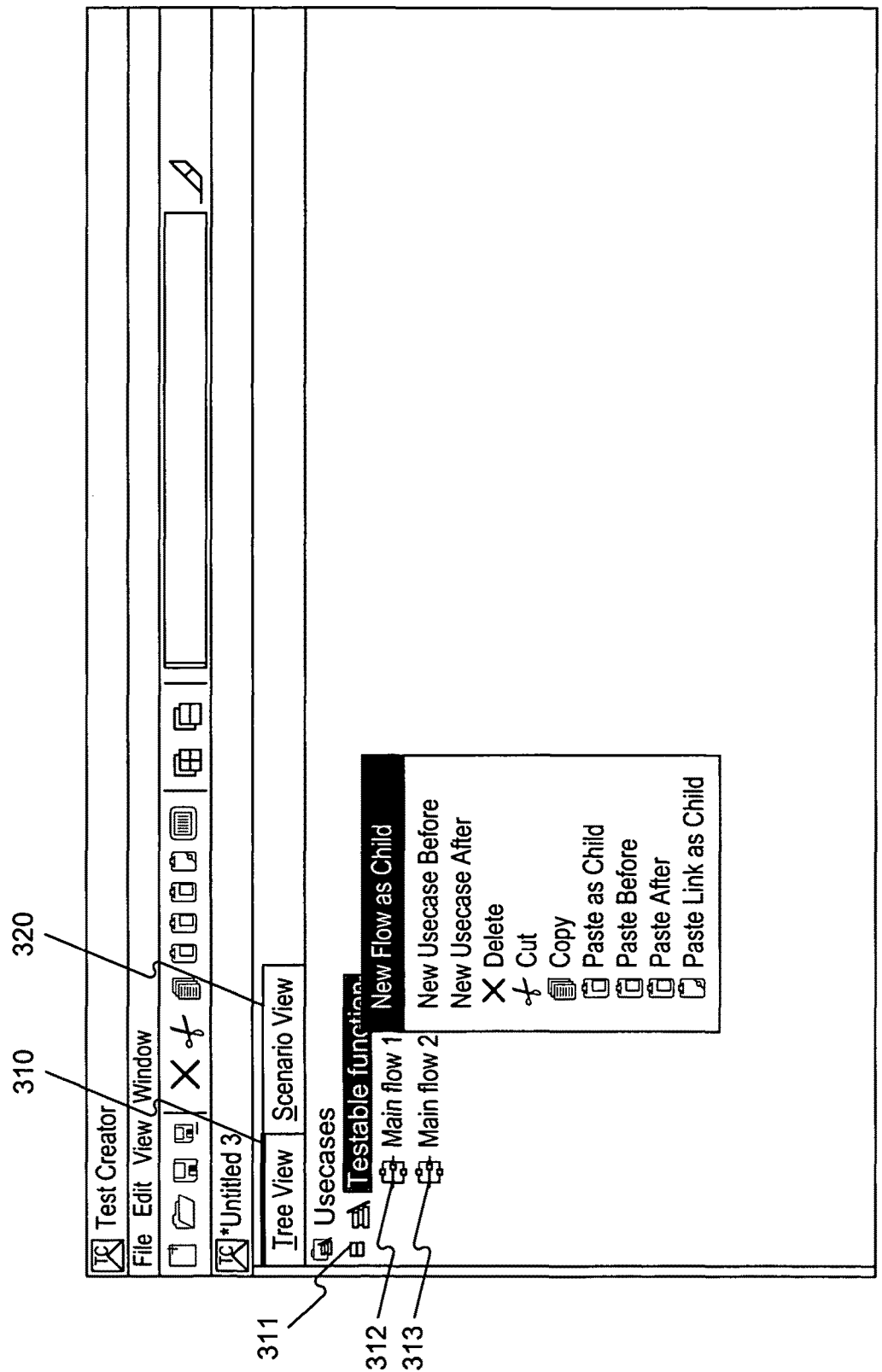

The modeling process may begin by user activating the modeling and testing tool 170 via user interface 127. FIG. 3A illustrates an exemplary screenshot generated by the modeling and testing tool 170. As illustrated, the screenshot includes a tree view workspace 310 (selected in the illustrated screenshot) and a scenario view workspace 320. Modeling and testing tool 170 may model a variety of the components within a use case, for example, state changes, returning values, and computations. As an initial step, use cases to be modeled may be entered into the modeling and testing tool 170 by entering a name of a use case to be modeled. For purposes of illustration, the name "Testable function" 311 has been entered for a use case. Subsequently, as illustrated in FIG. 3B, transaction flows for use case 311 may be created by the user. For purposes of explanation, transaction flows "Main flow1" 312 and "Main flow2" 313 have been created. Transaction flows 312 and 313 may be represented as nodes in the tree graph model being created.

Figure 3C:
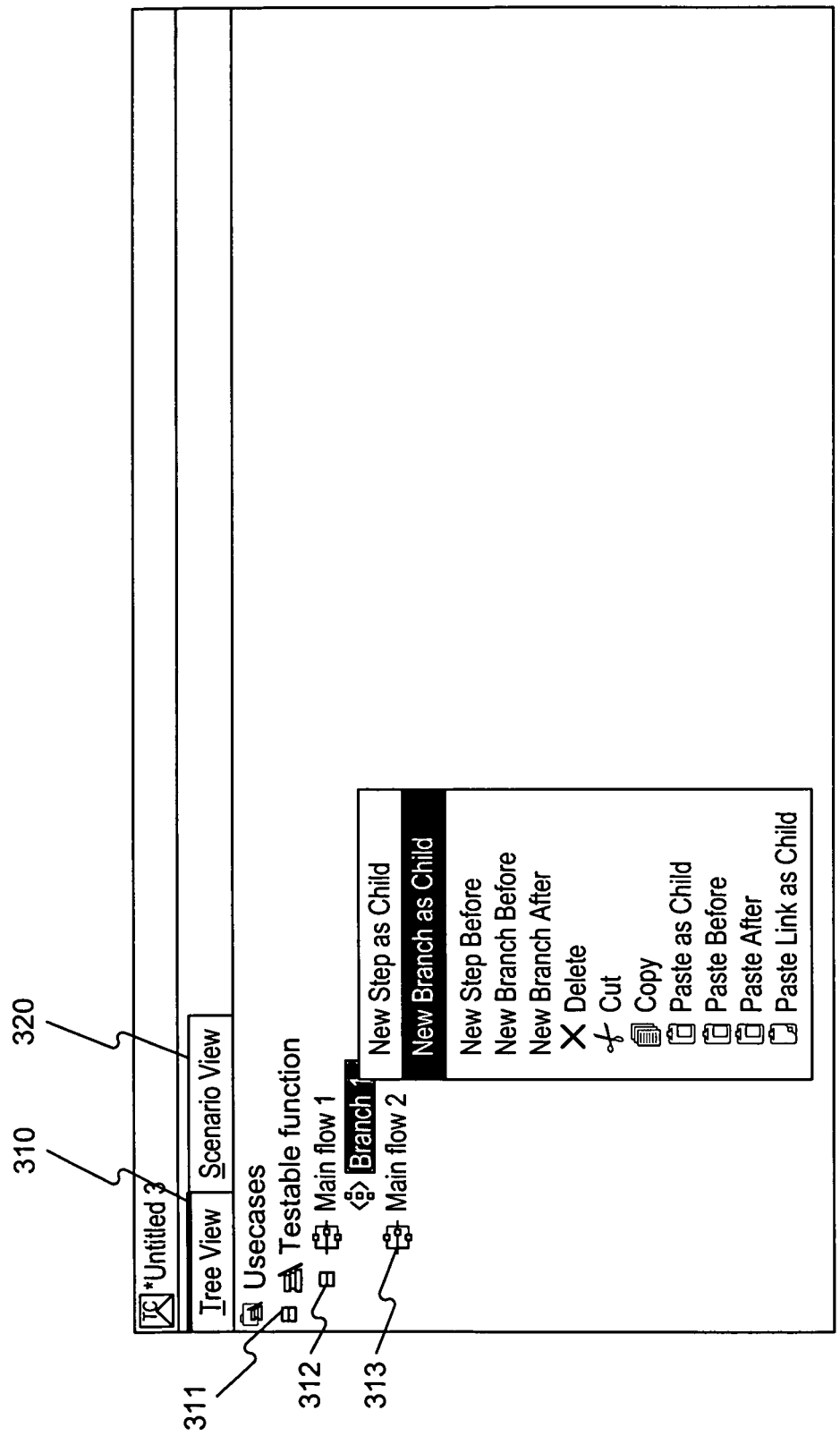
Figure 3D:
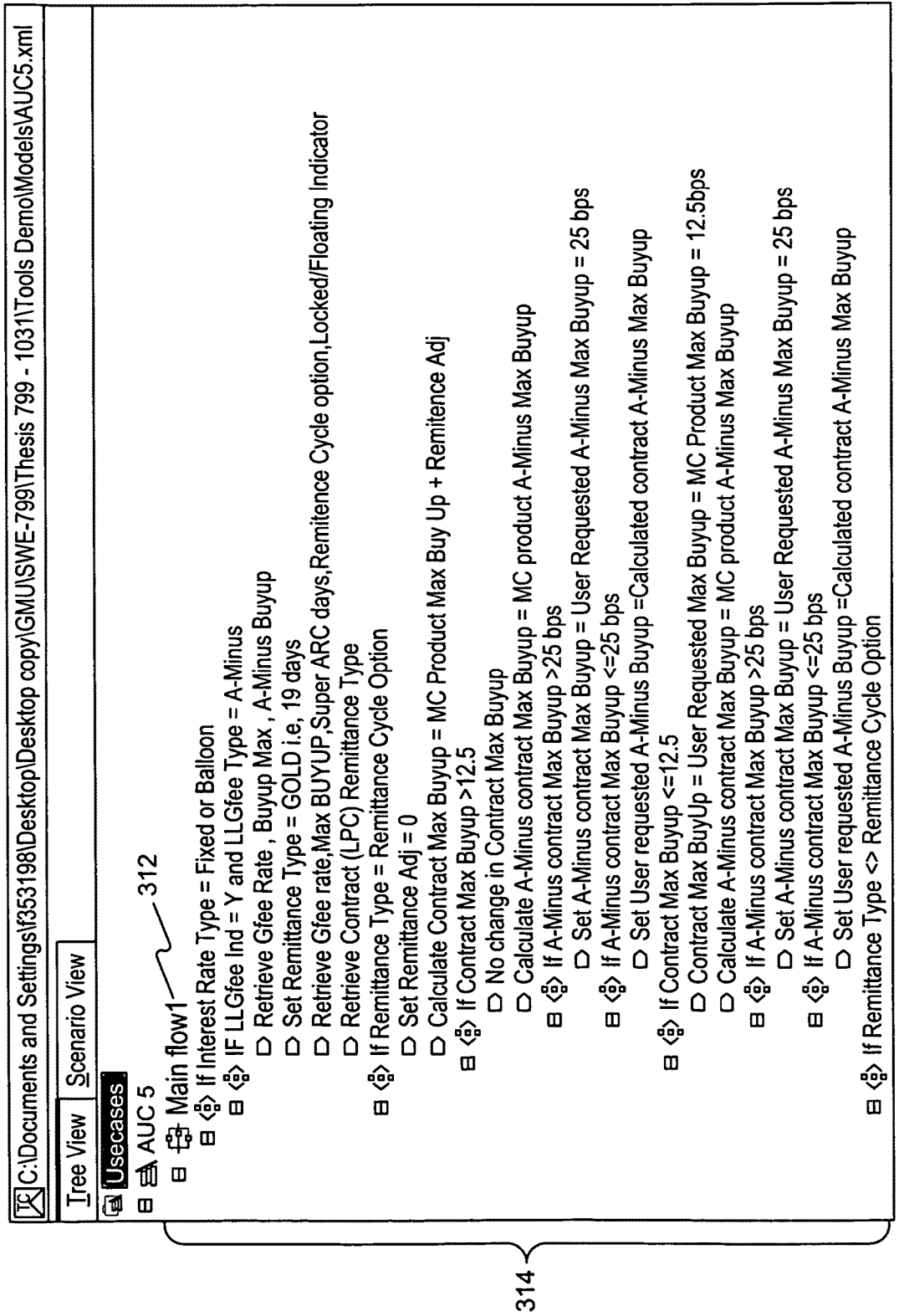

The primary scenario or typical course of events that describe a transaction flow of a use case may be represented as branches in the tree graph model. For example, as illustrated in FIG. 3C, a user may enter the steps for transaction flow 312. Steps may have sub-steps to further describe the transaction flow. An example of a modeled transaction flow (i.e., Main flow1 312) with steps and sub-steps of the transaction flow is illustrated in tree graph model 314 of FIG. 3D. In general, because use cases are usually expressed in terms that a user can understand, use cases rarely include complicated predicates that contain multiple clauses. Accordingly, a graph generated from use cases often result in a graph with complete path coverage.

Figure 4:
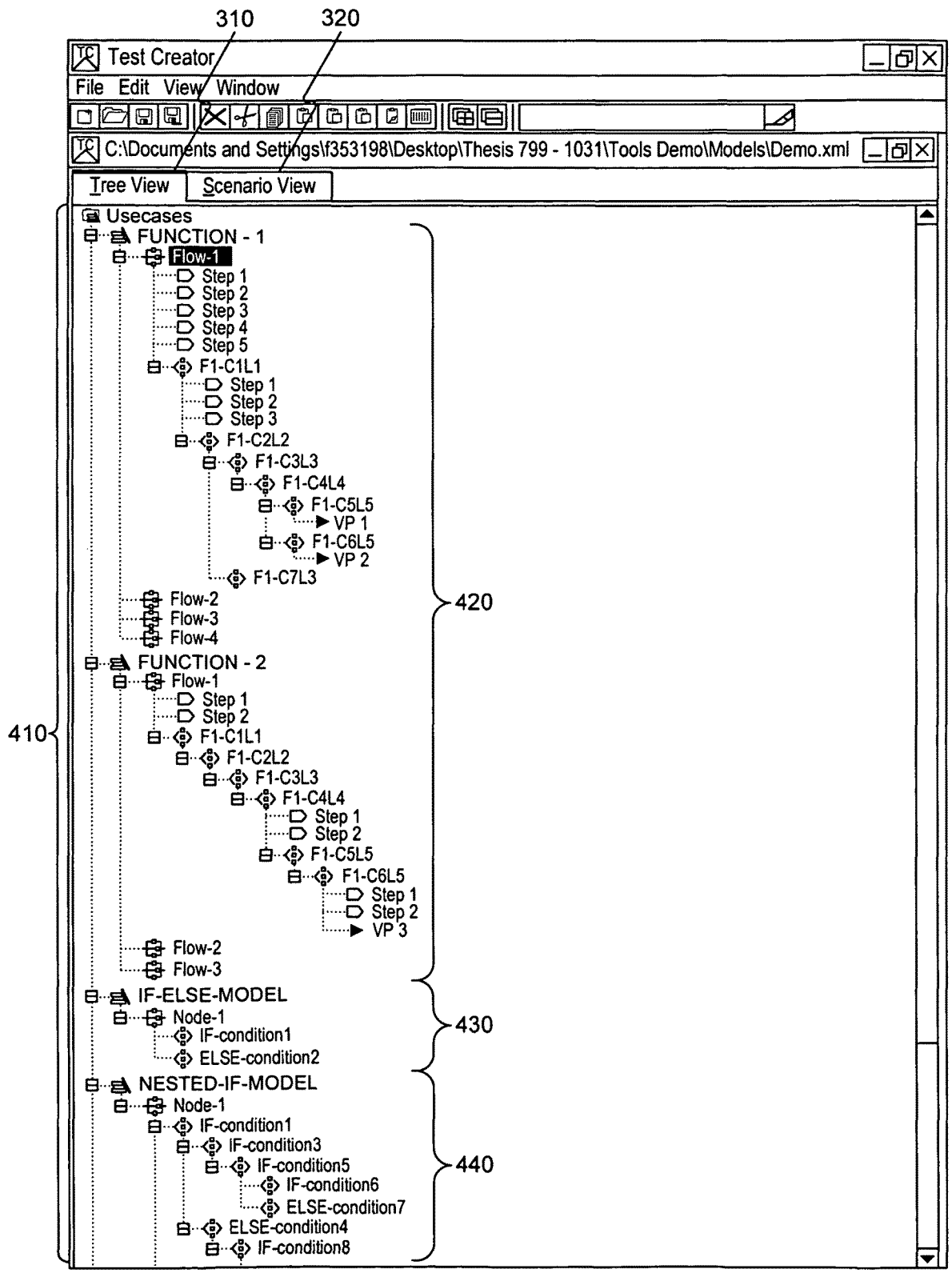

FIG. 4 illustrates the modeling of logical expressions, if-else statements, and nested if statements, which may also be contained in a requirements specification. The process of modeling logical expressions, if-else statements, and nested if statements is similar to the process disclosed above for modeling use cases. For example, FIG. 4 illustrates an exemplary tree graph model 410 comprising logical expressions 420, if-else statements 430, and nested if statements 440.

In modeling a logical expression, a user may define the scope of the testable function which needs to be further analyzed. In the illustrated example of FIG. 4, a user may define Function-1 as the root node for the tree graph model 410. In general, a logical expression may contain predicates and clauses. Predicates may be taken from if statements, case/switch statements, for loops, while loops, do-until loops, and the like.

If, for example, a logical expression has four predicates, it may be modeled using four nodes: Flow-1, Flow-2, Flow-3, and Flow-4. In addition, if there exists any activities or events along the flow between the root node, Function-1, and the four nodes of the predicates, they may be created as steps. To check the expected behavior of the logical expression, verification points may be added to the model. A verification point may be used to compare an actual result to an expected result. As illustrated in FIG. 4, exemplary tree graph model 410 for Function-1 may include verification points VP1 and VP2. Verification point VP1 may include five predicates represented as F1-C1L1, F1-C2L2, F1-C3L3, F1-C4L4, and F1-C5L5. Verification point VP2 may include five predicates, F1-C1L1, F1-C2L2, F1-C3L3, F1-C4L4, and F1-C6L5.

In instances wherein the logical expression includes compound predicates, prior to modeling, the compound predicates may be broken down to equivalent sequences of simple predicates or to the disjunctive normal form. If there are n clauses in a predicate, the combinatorial coverage of the logical expression leads to $2^n$ truth values. Applying appropriate predicate and clause coverage criteria results in n+1 truth-values.

Each of the tree graph models (e.g., tree graph models 314 and 410) generated by the modeling and testing module 170 may be stored in data repository 150 as an XML document for easy parsing of the text. The stored XML documents may be subsequently opened in any other standalone instance of the modeling and testing tool 170. For example, subsequent users may create additional models by editing, copying, or cutting and pasting portions of the XML document. FIG. 5 illustrates an exemplary portion of the XML document corresponding to tree graph model 314. Users may open multiple XML documents of previously created models, analyze these models separately, and cut and paste portions of the models into the tree view workspace 310 to create a new model or edit an existing model.

XML documents corresponding to models generated by the modeling and testing tool 170 may also be used to keep track of changes, as well as capture information related to the user who created or edited the model and the date and time the model was created or edited. The XML documents may also assist in configuration management. Configuration management is a field of management that focuses on establishing and maintaining consistency of a software's performance and its requirements, design, and operational information throughout the development process of the software.

In general, a test-ready model contains enough information to produce test cases for its implementation automatically. Accordingly, an algorithm may be designed to produce ready-to-run test cases with only the information (e.g., structure) in the model. Modeling and testing tool 170 may support both manual and automated test generation.

For example, in the exemplary DAG 200 illustrated in FIG. 2, an algorithm may be designed to identify test requirements by visiting a particular node or edge, or by touring a particular path in the graph. Utilizing such an algorithm, four test or paths (T) may be generated using the primary path coverage as T={a, b, d}, {a, b, e}, {a, c, f}, {a, c, g}. Each primary path corresponds to one scenario of the model (i.e., the DAG 200).

Modeling and testing module 170 may be utilized to produce ready to run test cases from, for example, generated tree graph model 314. In one embodiment, modeling and testing module 170 may utilize the basic tree-traversal algorithm to traverse the tree graph model 314. The activities/events/steps (i.e., represented as branches) in between the nodes of the tree graph model 314 are collected and displayed in the form of a continuous sequence of steps in the test case. The resulting test cases generated by the modeling and testing module 170 comprise a series of tests that will cover tree graph model 314 so that each object and relationship is exercised and errors are uncovered.

Figure 6:
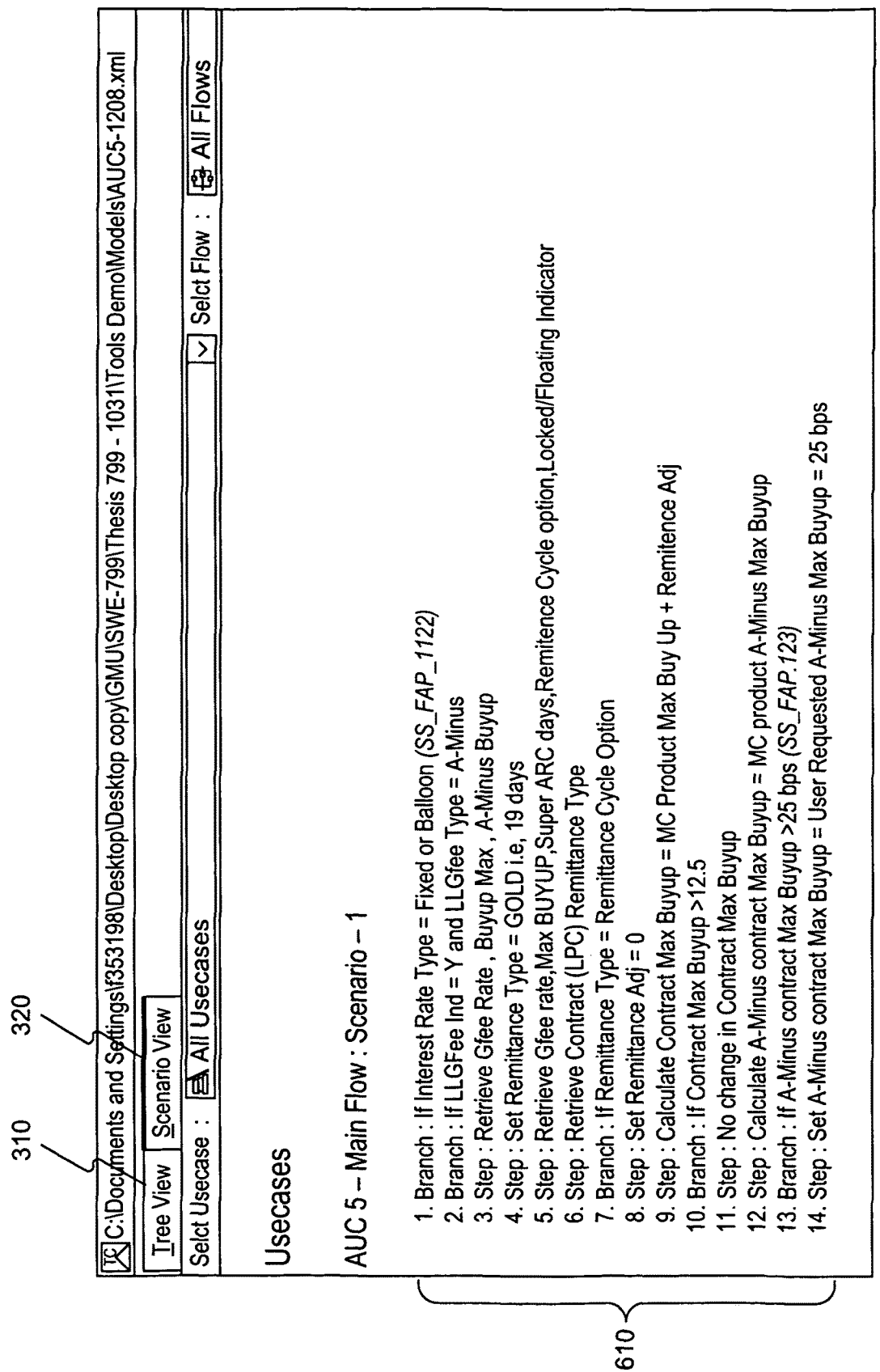

FIG. 6 illustrates an exemplary screenshot of test cases generated from tree graph model 314 using the basic tree-traversal algorithm. As indicated in FIG. 6, scenario view workspace 320 is selected. The selection of scenario view workspace 320 displays the test cases 610 generated by the traversal of the structure of tree graph model 314 using the basic tree-traversal algorithm. Test cases 610 map to a testing requirement.

Figure 7:
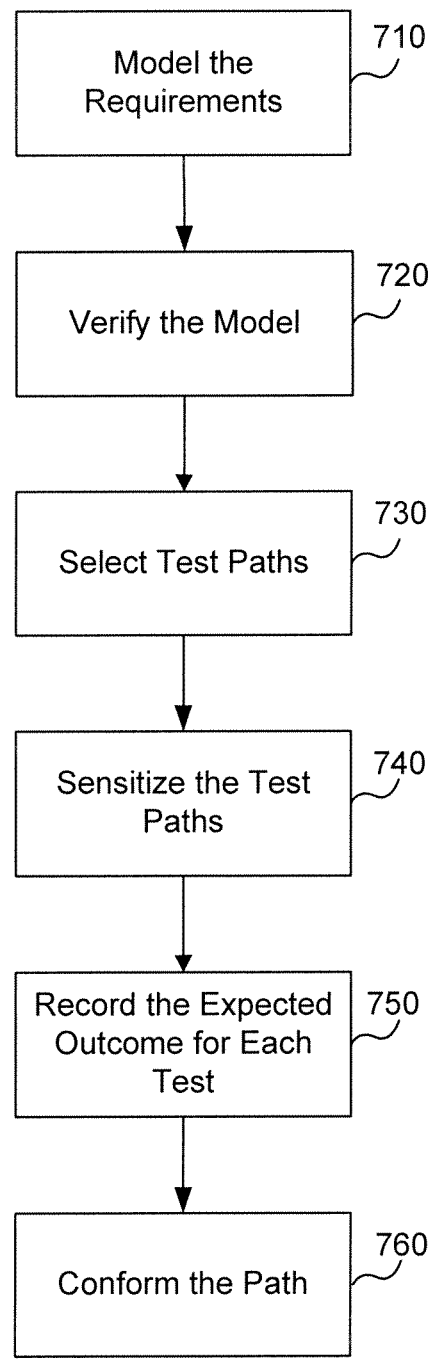
FIG. 7 is a flowchart of an exemplary method for modeling and generating test cases, consistent with the principles of the present invention.

FIG. 7 is a flowchart of exemplary steps used to model and test software requirements in accordance with modeling and testing tool 170. In the embodiment shown, in the initial step, the requirements of a software application, typically organized into a software requirements specification, are modeled (step 710). Once the requirements have been modeled, the model may be verified (step 720). For example, the model may be reviewed to ensure that the model provides complete path coverage for the requirements. In the instance wherein a logical expression is being modeled, if n clauses are present in a predicate of the logical expression, the combinatorial coverage of the logical expression leads to $2^n$ truth values. The model may be verified to ensure that appropriate predicate and clause coverage criteria results in n+1 truth-values.

A basic tree-traversal algorithm may be used to identify and select test paths within the model (step 730). Examples of test paths are illustrated in FIG. 6. In a subsequent step, the selected test paths may be sensitized (step 740). For example, a test path may be sensitized by inputting specific data values that would cause the software to do the equivalent of traversing the selected path if there were no bugs or errors in the path. The expected outcome for each test requirements may be recorded and stored by the modeling and testing tool 170 in data repository 170 (step 750). The expected outcomes may be compared to the outcome received from the sensitized test path. If the expected outcome differs from the outcome received from the sensitized test path, the path may be conformed to produce the expected result (step 760).

The foregoing description of possible implementations and embodiments consistent with the present invention does not represent a comprehensive list of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

What is claimed is:

1. A computer-implemented method for automated software requirements testing and sensitization for consistent performance, performed by a processor hosted on a server and connected via a network connection to at least one networked database, a modeling tool, and a client system, the method comprising:

retrieving modeling requirements of software, wherein the modeling requirements are specified in the form of one or more use cases for contract pricing:— receiving, via a graphical user interface, a user's selection of one or more portions of previously-created models;

generating, using the modeling tool, a tree graph model based on the modeling requirements and the one or more user-selected portions of previously-created models, wherein the tree graph model comprises one or more details for uncovering bugs or errors of the software;

analyzing the tree graph model and verifying complete path coverage for the modeling requirements, by determining whether predicate and clause coverage criteria of the tree graph model yields n+1 truth values, wherein n is a number of clauses in a predicate of a logical expression in the tree graph model;

generating a plurality of test paths for traversing the tree graph model, wherein the plurality of test paths uncover unhandled exceptions corresponding to the bugs or errors;

testing the modeling requirements by:
  selecting, using an algorithm based on the tree graph model, a test path among the plurality of test paths;

storing, in a memory, data associated with one or more expected outcomes from traversing the selected test path;

generating, using an algorithm and based on the selected test path, one or more data values that cause the processor to traverse one or more branches of the selected test path for the software without the bugs or errors;

sensitizing the selected test path by inputting the one or more data values;

generating a plurality of test cases based on the tree graph model and the one or more data values, wherein the plurality of test cases exercise each object and relationship in the selected test path;

generating one or more test outcomes by traversing the sensitized test path and the plurality of test cases via running the generated data values through the software;

retrieving the one or more expected outcomes;

comparing the one or more test outcomes to the one or more expected outcomes at multiple intermediate verification points along the selected test path; and conforming the selected test path to produce the expected outcomes, based on a difference between the one or more test outcomes and the one or more expected outcomes; and repeating the testing of the modeling requirements for the plurality of test paths, wherein the test paths are sensitized by inputting the one or more data values that cause the processor to do the equivalent of traversing the test paths if there were no bugs or errors and wherein the sensitized test paths are conformed to produce the expected outcomes.

2. The computer-implemented method of claim 1, wherein:

the requirements comprise one or more of a logical expression, a use case, a program structure, a sequence of events, or a sequence of actions.

3. The computer-implemented method of claim 1, wherein the tree graph model is generated by abstracting implementation details contained in one or more of a logical expression, a use case, a program structure, a sequence of events, or a sequence of actions.

4. The computer-implemented method of claim 1, wherein a node of the tree graph model represents a transaction flow of a use case.

5. The computer-implemented method of claim 4, wherein a first branch of the tree graph model represents a step of the transaction flow.

6. The computer-implemented method of claim 5, wherein a second branch of the tree graph model represents a verification point.

7. The computer-implemented method of claim 1, wherein the tree graph model is a directed acyclic graph.

8. The computer-implemented method of claim 1, wherein the tree graph models comprise predicates and clauses of a logical expression.

9. A non-transitory computer-readable medium storing instructions, which, when executed by a by a processor hosted on a server and connected via a network connection to at least one networked database, a modeling tool, and a client system, perform a method for automated software requirements testing and sensitization for consistent performance, the method comprising:

retrieving modeling requirements of software, wherein the modeling requirements are specified in the form of one or more use cases for contract pricing:— receiving, via a graphical user interface, a user's selection of one or more portions of previously-created models;

generating, using the modeling tool, a tree graph model based on the modeling requirements and the one or more user-selected portions of previously-created models, wherein the tree graph model comprises one or more details for uncovering bugs or errors of the software;

analyzing the tree graph model and verifying complete path coverage for the modeling requirements, by determining whether predicate and clause coverage criteria of the tree graph model yields n+1 truth values, wherein n is a number of clauses in a predicate of a logical expression in the tree graph model;

generating a plurality of test paths for traversing the tree graph model, wherein the plurality of test paths uncover unhandled exceptions corresponding to the bugs or errors;

testing the modeling requirements by:

selecting, using an algorithm based on the tree graph model, a test path among the plurality of test paths;

storing, in a memory, data associated with one or more expected outcomes from traversing the selected test path;

generating, using an algorithm and based on the selected test path, one or more data values that cause the processor to traverse one or more branches of the selected test path for the software without the bugs or errors;

sensitizing the selected test path by inputting the one or more data values;

generating a plurality of test cases based on the tree graph model and the one or more data values, wherein the plurality of test cases exercise each object and relationship in the selected test path;

generating one or more test outcomes by traversing the sensitized test path and the plurality of test cases using the generated data values;

retrieving the one or more expected outcomes;

comparing the one or more test outcomes to the one or more expected outcomes at multiple intermediate verification points along the selected test path; and conforming the selected test path to produce the expected outcomes, based on a difference between the one or more test outcomes and the one or more expected outcomes; and repeating the testing of the modeling requirements for the plurality of test paths, wherein the test paths are sensitized by inputting the one or more data values that cause the processor to do the equivalent of traversing the test paths if there were no bugs or errors and wherein the sensitized test paths are conformed to produce the expected outcomes.

10. The computer-readable medium of claim 9, wherein:

the requirements comprise one or more of a logical expression, a use case, a program structure, a sequence of events, or a sequence of actions.

11. The computer-readable medium of claim 9, wherein the tree graph model is generated by abstracting implementation details contained in one or more of a logical expression, a use case, a program structure, a sequence of events, or a sequence of actions.

12. The computer-readable medium of claim 9, wherein a node of the tree graph model represents a transaction flow of a use case.

13. The computer-readable medium of claim 11, wherein a first branch of the tree graph model represents a step of the transaction flow.

14. The computer-readable medium of claim 13, wherein a second branch of the tree graph model represents a verification point.

15. The computer-readable medium of claim 9, wherein the tree graph model is a directed acyclic graph.

16. The computer-readable medium of claim 9, wherein the tree graph models comprise predicates and clauses of a logical expression.

17. A system for automated software requirements testing and sensitization for consistent performance comprising:
    a memory storing program instructions; and
    a processor hosted on a server and connected via a network connection to at least one networked database, a modeling tool, and a client system wherein the processor executes the program instructions to perform operations comprising:
        retrieving modeling requirements of software, wherein the modeling requirements are specified in the form of one or more use cases for contract pricing;
        receiving, via a graphical user interface, a user's selection of one or more portions of previously-created models;
        generating, using the modeling tool, a tree graph model based on the modeling requirements and the one or more user-selected portions of previously created models, wherein the tree graph model comprises one or more details for uncovering bugs or errors of the software;
        analyzing the tree graph model and verifying complete path coverage for the modeling requirements, by determining whether predicate and clause coverage criteria of the tree graph model yields n+1 truth values, wherein n is a number of clauses in a predicate of a logical expression in the tree graph model;
        generating a plurality of test paths for traversing the tree graph model, wherein the plurality of test paths uncover unhandled exceptions corresponding to the bugs or errors;
        testing the modeling requirements by:
            selecting, using an algorithm based on the tree graph model, a test path among the plurality of test paths;
            storing, in a memory, data associated with one or more expected outcomes from traversing the selected test path;
            generating, using an algorithm and based on the selected test path, one or more data values that cause the processor to traverse one or more branches of the selected test path for the software without the bugs or errors;
            sensitizing the selected test path by inputting the one or more data values;
            generating a plurality of test cases based on the tree graph model and the one or more data values, wherein the plurality of test cases exercise each object and relationship in the selected test path;
            generating one or more test outcomes by traversing the sensitized test path and the plurality of test cases using the generated data values;
            retrieving the one or more expected outcomes;
            comparing the one or more test outcomes to the one or more expected outcomes at multiple verification points along the selected test path; and
            conforming the selected test path to produce the expected outcomes, based on a difference between the one or more test outcomes and the one or more expected outcomes; and
        repeating the testing of the modeling requirements for the plurality of test paths, wherein the test paths are sensitized by inputting the one or more data values that cause the processor to do the equivalent of traversing the test paths if there were no bugs or errors and wherein the sensitized test paths are conformed to produce the expected outcomes.

18. The system of claim 17, wherein:
    the requirements comprise one or more of a logical expression, a use case, a program structure, a sequence of events, or a sequence of actions.

19. The system of claim 17, wherein the tree graph model is generated by abstracting implementation details contained in one or more of a logical expression, a use case, a program structure, a sequence of events, or a sequence of actions.

20. The system of claim 17, wherein a node of the tree graph model represents a transaction flow of a use case.

21. The system of claim 20, wherein a branch of the tree graph model represents a step of the transaction flow.

22. The system of claim 17, wherein the tree graph model is a directed acyclic graph.

23. The system of claim 17, wherein the tree graph models comprise predicates and clauses of a logical expression.

\* \* \* \* \*